Oct. 17, 1967  W. A. GEYGER  3,348,120
SQUARE-LAW CIRCUIT
Filed Oct. 1, 1964
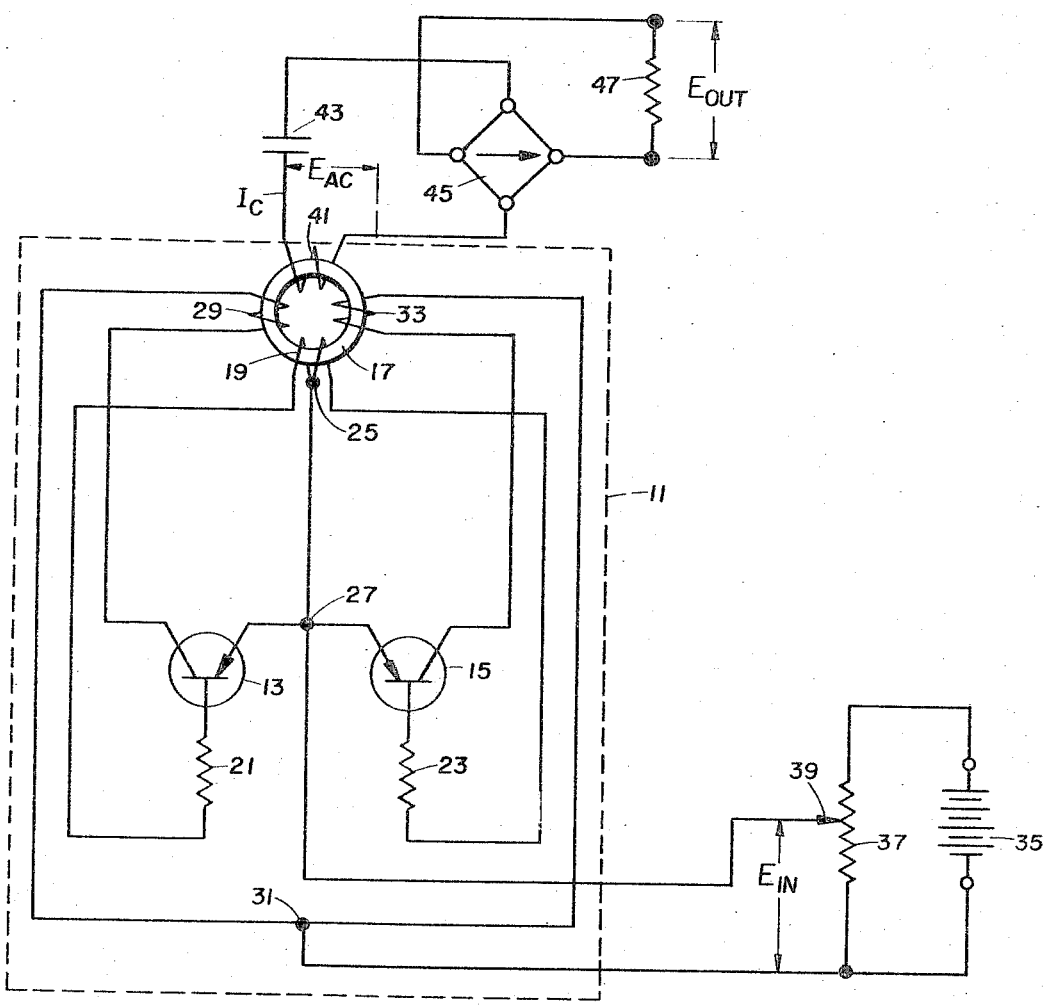
INVENTOR.
William A. Geyger, DECEASED,
BY Ella Geyger, EXECUTRIX.
BY
ATTORNEY 3,348,120
SQUARE-LAW CIRCUIT
William A. Geyger, deceased, late of Takoma Park, Md.,
by Ella Geyger, executrix, 8510 Flower Ave., Takoma
Park, Md. 20012
Filed Oct. 1, 1964, Ser. No. 400,964
2 Claims. (Cl. 321—2)

ABSTRACT OF THE DISCLOSURE

A square-law circuit has switching transistors connected to windings on a magnetic core. When a D.C. voltage is applied, an output winding on the core produces a square-wave; the frequency and magnitude of which are each linearly related to the magnitude of the D.C. voltage. The output winding is connected to a series capacitor and the input of a rectifier. The output of the rectifier provides a D.C. voltage which is the square of the first D.C. voltage.

---

The invention described herein may be manufactured and used by or for the Government of the United States of America for governmental purposes without the payment of any royalties thereon or therefor.

This invention relates to a multiplier circuit and more specifically a circuit which performs a square-law function.

In working with the switching-transistor magnetic-core multivibrator as a source of square-wave A.C. voltage as a power supply for various magnetic devices such as magnetic amplifiers, magnetic modulators and flux gate magnetometers, it was noted by the inventor that the output voltage and frequency of the magnetic core multivibrator were linearly proportional to the magnitude of the D.C. voltage used as an energizing source for the multivibrator. While observing these phenomena, it occurred to the inventor that a capacitive reactance of a capacitor also varies linearly as the frequency of an A.C. voltage varies. By combining these phenomenon the inventor was able to achieve the unique result of providing a square-law circuit.

In this invention a switching-transistor magnetic-core multivibrator is employed which is supplied with a D.C. voltage source having a variable magnitude, such as a varying D.C. signal. A capacitor and a rectifier bridge are employed in the output circuit to provide a square-law function circuit.

It is another object of this invention to provide an electrical circuit in which the output voltage is a square-law function of the input voltage.

It is further an object of this invention to provide an electrical circuit in which the output voltage is a second dimensional product of the input voltage.

It is still a further object of this invention to provide a unique combination of a switching-transistor magnetic-core multivibrator with a capacitor circuit to perform a square-law function.

Other objects and many of the attendant advantages of this invention will be readily appreciated as the same becomes better understood by reference to the following detailed description when considered in connection with the accompanying drawing.

The drawing of this invention illustrates schematically a switching-transistor magnetic-core multivibrator for performing a square-law function.

Referring now to the drawing, a switching-transistor magnetic-core multivibrator 11 is shown having switching transistors 13 and 15 and magnetic core 17. Winding 19 on core 17 is connected to the base terminals of transistors 13 and 15 through resistors 21 and 23. Winding 19 has a center tap 25 which is connected to a juncture 27 which connects the emitters of transistors 13 and 15. A winding 29 on core 17 is connected to a collector terminal of transistor 13 and to a common juncture 31. A winding 33 on core 17 is connected to a collector terminal of transistor 15 and to the common juncture 31. A D.C. voltage supply such as battery 35 may be connected across a potentiometer 37 having a moveable tap 39. The moveable tap 39 is connected to juncture 27 and to center tap 25 to provide the positive polarity connection from battery 35 to the multivibrator. Common juncture 31 is connected to the negative terminal of battery 35. It is noted that the voltage $E_{in}$ which is shown as supplied by a battery 35 may also be another source of voltage such as a varying D.C. signal. A secondary or output winding 41 on core 17 is connected to a capacitor 43 and to rectifier bridge 45. A resistor 47 is connected across the output of rectifier bridge 45 to form an output or load circuit. An output voltage $E_{out}$ appears across resistor 47.

In the operation of this device, the D.C. voltage applied to terminals 27 and 31 will cause a conduction in either transistor 13 or transistor 15 and alternate conduction of transistor 13 and transistor 15 will cause a square-wave voltage to be induced in winding 41. The square-wave A.C. voltage developed in winding 41 will have a magnitude which is linearly proportional to the input voltage $E_{in}$ and will have a frequency which is linearly proportional to the voltage $E_{in}$. The foregoing relationships are inherent in the operation of the switching-transistor multivibrator. The switching rate of transistors 13 and 15, and thus the frequency, may be controlled by the magnitude of voltage $E_{in}$ which in the case of the illustrated embodiment may be selected by moving potentiometer arm 39, and in other cases may be the instantaneous potential of a varying D.C. signal.

Stating the two linear relationships of the multivibrator mathematically, the following equations result:

$$E_{ac} = a \text{ constant} \times E_{in} \qquad (1)$$

Where $E_{ac}$ is the voltage across the winding 41 of the multivibrator 11 and $E_{in}$ is the input voltage of the D.C. voltage source applied to terminals 27 and 31;

$$f_{osc} = a \text{ constant} \times E_{in} \qquad (2)$$

where $f_{osc}$ is the frequency of voltage $E_{ac}$. Applying the basic reactance formula to the instant circuit:

$$X_c = \frac{1}{2\pi f_{osc} C}$$

where $X_c$ is the capacitive reactance of capacitor 43 and $C$ is the capacity of capacitor 43. Neglecting resistance losses which may be kept very small in comparison to the capacitive reactance $X_c$ the total impedance of the circuit may be considered as $$X_c = \frac{E_{ac}}{I_c} = \frac{1}{2\pi f_{osc} C}$$

and from this equation, the following equation results:

$$I_c = 2\pi f_{osc} C E_{ac} \qquad (3)$$

where $I_c$ is the current flowing through capacitor 43. Since $E_{ac} = a \text{ constant} \times E_{in}$, Equation 1, and $$f_{ocs} = a \text{ constant} \times E_{in}$$

then substituting the equivalents into Equation 3 the following equation results:

$$I_c = a \text{ constant} \times E_{in}^2 \qquad (4)$$

and neglecting resistance losses through rectifier 45 and across load 47 which may be kept extremely small compared to $X_c$, then $$E_{out} = \text{a constant} \times E_{in}^2 \quad (5)$$

were $E_{out}$ is the voltage appearing across output resistor 47.

Obviously many modifications and variations of the present invention are possible in light of the above teachings. It is therefore to be understood, that within the scope of the appended claims, the invention may be practiced otherwise than as specifically described.

What is claimed and desired to be secured by Letters Patent of the United States is:

1. A circuit for performing a square-law function,
   a switching-transistor magnetic-core multivibrator having a first transistor having a collector, an emitter, and a base,
   a second transistor having a collector, an emitter, and a base,
   a saturable core,
   first winding means on said core and having a center tap,
   second winding means on said core and having a center tap,
   means connecting said bases to said first winding means,
   means connecting the collectors of said first and second transistors to said second winding means,
   an output winding means on said core,
   a source of D.C. voltage having a positive terminal and a negative terminal,
   means connecting said positive terminal to the emitters of said first and second transistors and to the center tap of said first winding means,
   means connecting said negative terminal to the center tap of said second winding means whereby said transistors may be energized,
   a square-law output circuit comprising a capacitor, a diode bridge rectifier having input terminals and output terminals, means serially connecting said capacitor and said output winding to said input terminals, load means connected to said output terminals whereby an output voltage may be produced across said load means which is proportional to the square of the magnitude of the input voltage from said D.C. voltage source.

2. A circuit for performing a square-law function,
   a switching-transistor magnetic core multivibrator having a first transistor having a collector, an emitter, and a base,
   a second transistor having a collector, an emitter, and a base,
   a saturable core,
   first winding means on said core and having a center tap,
   second winding means on said core and having a center tap,
   means connecting said bases to said first winding means,
   means connecting the collectors of said first and second transistors to said second winding means,
   an output winding means on said core,
   positive connection means and negative connection means connectible, respectively, to the positive terminal and the negative terminal of a source of unidirectional voltage,
   means connecting said positive connection means to the emitters of said first and second transistors and to the center tap of said first winding means,
   means connecting said negative connection means to the center tap of said second winding means,
   a square-law output circuit comprising a capacitor, a diode bridge rectifier having input terminals and output terminals, means serially connecting said capacitor and said output winding to said input terminals, load means connected to said output terminals whereby an output voltage may be produced across said load means which is proportional to the square of the magnitude of the source voltage.

References Cited
UNITED STATES PATENTS

| | | | |
|---|---|---|---|
| 2,967,989 | 1/1961 | Eno et al. | 321—2 |
| 3,243,683 | 3/1966 | Ackley | 321—2 |

OTHER REFERENCES

Electronics, "Battery Powered Converter Runs Multiplier Phototube," by R. P. Rufer, July 8, 1960, vol. 33, No. 28, page 51.

JOHN F. COUCH, *Primary Examiner.*

W. H. BEHA, JR., *Assistant Examiner.*